United States Patent
Kimura et al.

(10) Patent No.: US 10,389,194 B2
(45) Date of Patent: Aug. 20, 2019

(54) PERMANENT MAGNET ELECTRICAL ROTATING MACHINE WITH PROTECTION MEMBERS ARRANGED BETWEEN PERMANENT MAGNETS AND ROTOR CORES

(71) Applicant: Hitachi, Ltd., Chiyoda-ku, Tokyo (JP)

(72) Inventors: Mamoru Kimura, Tokyo (JP); Masahiro Hori, Tokyo (JP); Youichi Matsumoto, Tokyo (JP); Tetsuo Fujigaki, Tokyo (JP); Motonobu Iiduka, Tokyo (JP); Yoshihiro Yasui, Tokyo (JP); Eiichirou Tokizaki, Tokyo (JP); Masanori Matsumoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 383 days.

(21) Appl. No.: 15/305,375

(22) PCT Filed: Dec. 3, 2014

(86) PCT No.: PCT/JP2014/081991
§ 371 (c)(1),
(2) Date: Dec. 22, 2016

(87) PCT Pub. No.: WO2015/162817
PCT Pub. Date: Oct. 29, 2015

(65) Prior Publication Data
US 2017/0155292 A1    Jun. 1, 2017

(30) Foreign Application Priority Data
Apr. 23, 2014 (JP) ................. 2014-088687

(51) Int. Cl.
*H02K 1/27* (2006.01)
*H02K 1/32* (2006.01)
(Continued)

(52) U.S. Cl.
CPC ......... *H02K 1/2706* (2013.01); *H02K 1/2766* (2013.01); *H02K 1/32* (2013.01); *H02K 9/02* (2013.01); *H02K 9/10* (2013.01)

(58) Field of Classification Search
CPC ...... H02K 1/2706; H02K 1/2766; H02K 1/32; H02K 9/02; H02K 9/10
See application file for complete search history.

(56) References Cited

U.S. PATENT DOCUMENTS 4,472,651 A * 9/1984 Jones .................... H02K 1/276
                                                        310/156.78
4,663,551 A * 5/1987 Weh ...................... H02M 7/515
                                                        310/12.22
(Continued)

FOREIGN PATENT DOCUMENTS

JP      2001-25209 A    1/2001
JP      2010-534459 A   11/2010
(Continued)

OTHER PUBLICATIONS

Japanese-language Office Action issued in counterpart Japanese Application No. 2014-088687 dated Jun. 5, 2018 with English translation (six (6) pages).
(Continued)

*Primary Examiner* — Emily P Pham
(74) *Attorney, Agent, or Firm* — Crowell & Moring LLP (57) ABSTRACT

A permanent magnet electrical rotating machine is provided which is capable of contributing to protected permanent magnets and increased cooling performance during operation. The permanent magnet electrical rotating machine includes: permanent magnets; rotor cores that have the permanent magnets mounted thereto and are laminated in a rotating axis direction; spacers that are placed between adjacent rotor cores; and permanent magnet protection members that are installed between the permanent magnets and the rotor cores and also placed to maintain radial continuity in space partitioned by the spacers between the rotor cores.

15 Claims, 4 Drawing Sheets

(51) Int. Cl.
    *H02K 9/02*         (2006.01)
    *H02K 9/10*         (2006.01)

(56) References Cited

U.S. PATENT DOCUMENTS

| | | | |
|---|---|---|---|
| 5,763,977 A * | 6/1998 | Shimasaki | H02K 21/024 310/162 |
| 6,969,937 B1 * | 11/2005 | Schuering | H02K 1/2766 310/156.01 |
| 2010/0127584 A1 | 5/2010 | Gottfried | |

FOREIGN PATENT DOCUMENTS

| | | |
|---|---|---|
| JP | 2012-257390 A | 12/2012 |
| JP | 2014-23265 A | 2/2014 |
| WO | WO 92/07409 | 4/1992 |

OTHER PUBLICATIONS

International Search Report (PCT/ISA/210) issued in PCT Application No. PCT/JP2014/081991 dated Jan. 13, 2015 with English Translation (Three (3) pages).

Japanese-language Written Opinion (PCT/ISA/237) issued in PCT Application No. PCT/JP2014/081991 dated Jan. 13, 2015 (Three (3) pages).

\* cited by examiner

PERMANENT MAGNET ELECTRICAL ROTATING MACHINE WITH PROTECTION MEMBERS ARRANGED BETWEEN PERMANENT MAGNETS AND ROTOR CORES

TECHNICAL FIELD

The present invention relates to a permanent magnet electrical rotating machine, more particularly, to a permanent magnet electrical rotating machine suitable for, for example, wind power generation.

BACKGROUND ART

In recent years, the installed wind capacity is dramatically increased, thus increasing the need for large-scale permanent magnet electrical rotating machines larger than 1 MW with the aim of increasing the per-machine capacity to achieve greater economy, enhancing the efficiency of generators and reducing size and weight.

For application of a large-scale permanent magnet electrical rotating machine to wind power generation, a long life span of about 20 years is required. Thus, the permanent magnet performance is required to be maintained for about 20 years. For regular permanent magnets, a coating is applied to the surface of the permanent magnet with consideration given to environmental resistance. However, the coating to the magnets of a rotor of the interior permanent magnet structure is disadvantageously damaged when the magnets are inserted. Thus, a member for protecting the coating is required when the magnets are inserted.

Also, in the large scale machines, even if higher efficiency is achieved, the loss results in being high as an absolute value. To avoid this, if it is attempted to obtain a heat density nearly equal to that in small scale machines in order to minimize the loss, an increase in size of the permanent magnet electrical rotating machine is anyhow necessary. The increase in size of the permanent magnet electrical rotating machine results in an increase in weight, leading to an increase of the cost of manufacturing and the cost of building a windmill. As a result, a reduction in size of the permanent magnet electrical rotating machine and an increase in heat density are necessary.

A necessity for realizing an electrical rotating machine with a high heat density is an enhancement of cooling structure. For usual electrical rotating machines without use of permanent magnets, providing a duct is contemplated as a way of solving the problem. However, a large-scale permanent magnet electrical rotating machine provided with a duct has been almost unprecedented, and especially, one with consideration given to the relationship with a magnet protection member has been unprecedented.

Patent Literature 1 discloses the method of obtaining a rotor of an interior permanent magnet motor which prevents damage to a permanent magnet and also has outstanding motor performance.

CITATION LIST

Patent Literature

Patent Literature 1: Japanese Patent Application Laid-Open No. 2012-257390

SUMMARY OF INVENTION

Technical Problem

The technique disclosed in Patent Literature 1 presents a rotor of an interior permanent magnet motor into which a permanent magnet and a non-magnetic material-made cover are inserted, the cover surrounding the permanent magnet such that two side faces of the permanent magnet where the magnetic field line intersects are exposed. However, cooling is not particularly considered in the technique.

It is an object of the present invention to provide a permanent magnet electrical rotating machine contributing to protected permanent magnets and increased cooling performance during operation.

Solution to Problem

To address the above problems, a permanent magnet electrical rotating machine according to the present invention includes: permanent magnets; rotor cores that have the permanent magnets mounted thereto and are laminated in a rotating axis direction; spacers that are placed between adjacent ones of the rotor cores in an axial direction; and permanent magnet protection members that are installed between the permanent magnets and the rotor cores and also placed to maintain radial continuity in space partitioned by the spacers between the rotor cores.

Advantageous Effects of Invention

According to one aspect of the present invention, it is possible to provide a permanent magnet electrical rotating machine contributing to protected permanent magnets and increased cooling performance during operation.

DESCRIPTION OF EMBODIMENTS

Embodiments of a permanent magnet electrical rotating machine according to the present invention will now be described with reference to the accompanying drawings. Throughout the drawings, the same numerals are used to refer to the same components. The following embodiments are provided for illustrative purpose only, and any implementation of the present invention is not intended to be limited to the following specific aspects. Various modifications and the like may be made irrelevant to the following embodiments.

Embodiment 1

Figure 1:
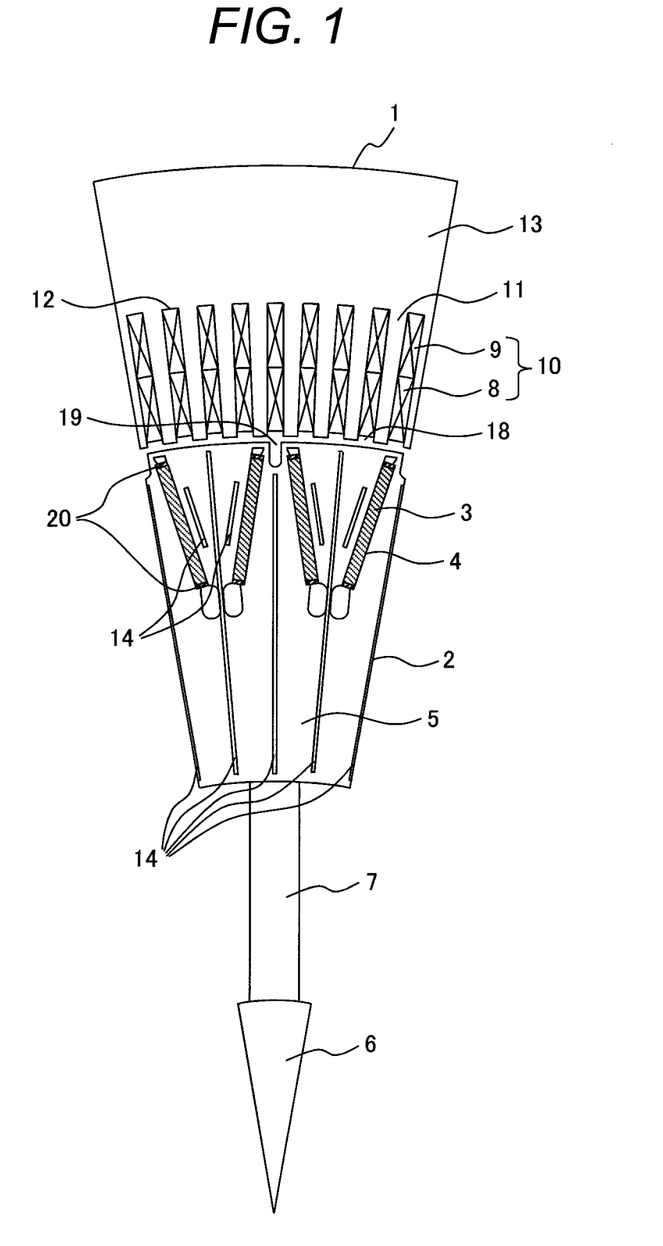
FIG. 1 is a sectional view of a two-pole segment, illustrating a permanent magnet electrical rotating machine according to a first embodiment of the present invention (Embodiment 1).

FIG. 1 illustrates a two-pole segment of permanent magnet electrical rotating machine having 36 poles and 162 slots according to a first embodiment of a permanent magnet electrical rotating machine according to the present invention. The number of poles and the number of slots are shown merely by way of example.

In the embodiment, a permanent magnet electrical rotating machine ranging in size from several hundred kW to several tens MW is mainly described. As illustrated in FIG. 1, the permanent magnet electrical rotating machine according to the embodiment principally includes: a shaft 6 serving as a rotating axis; a rotor 2 rotating through spiders 7 as the shaft 6 rotates, and includes permanent magnets 3; and a stator 1 placed outside the outside-diameter periphery of the rotor 2 to face the rotor 2 and leaving a gap 18 from the rotor 2.

The stator 1 is structured as a distributed winding stator, in which a coil 10 is distributed and wound around stator teeth 11 formed on stator cores 13, and these distributed windings extend along the circumferential direction. The stator cores 13 are placed to leave a gap from rotor cores 5 in the radial direction, and are laminated in the rotating axis direction. The coil 10 has three UVW phase windings, and, for example, the number of slots is 162 and 36 poles are formed electrically in the structure described in the embodiment. The coil 10 also includes two coils, an upper coil 8 and a lower coil 9, placed in the stator slots 12 each formed between adjacent stator teeth 11. It is noted that although the embodiment describes the distributed winding stator by way of example, it will be apparent that the winding pattern is not limited to the above-described pattern and another winding pattern may be employed. As another example, there is concentrated winding, in which, for example, a coil is concentratedly wound on the stator teeth.

The rotor 2 is connected through the spiders 7 to the shaft 6. The rotor 2 has the rotor cores 5 laminated in the axial direction of the shaft 6, as well as the permanent magnets 3 placed respectively in magnet insertion holes 4 formed in outside-diameter-periphery portions of the rotor cores 5, and permanent-magnet protection members (hereinafter simply referred to as "magnet protection members") 20 for protecting the permanent magnets 3. The rotor rotates as the shaft 6 rotates. The magnet protection members 20 are fixed to the permanent magnets 3, but are capable of protecting the permanent magnets 3 by being placed between the permanent magnets 3 and the rotor cores 5. Note that any number of spiders 7 may be used as long as the spiders are able to transfer torque. In the embodiment, the eight spiders are selected for use, although all the spiders are not shown. In the embodiment, also, same-pole magnets are arranged in a V-shaped form, in which two permanent magnets 3 inclined with respect to the radial direction are used to form a single pole. In the embodiment, for the purpose of easier ventilation, a between-pole ventilation-groove 19 is formed between adjacent magnetic poles and in the outward ends of the rotor cores 5 to serve as a communication element creating axial air communication. If the permanent magnet electrical rotating machine has a thermal margin, no between-pole ventilation-groove 19 may be formed. Further, duct pieces 14 are provided to serve as spacers for defining passages through which air passes in the radial direction. The duct pieces 14 have a section extending between adjacent permanent magnets 3 in the radial direction, and on both sides of this section in the circumferential direction, sections respectively placed parallel to the permanent magnets 3. The arrangement in the embodiment is described as one example, and another arrangement present may be employed without any problem as long as the passage of air is allowed. The space created between adjacent spiders 7 forms a communication passage establishing air communication in the rotating axis direction. A coolant passes through the communication passage to be delivered in the axial direction in a location inward of the magnets 3 in the radial direction.

The magnet protection members 20 are placed to maintain radial continuity in space partitioned by the duct pieces 14 between rotor cores 5 adjacent each other in the axial direction. Therefore, the space does not interfere with the flowing of the coolant from the radially inward side toward the radially outward side. Also, the magnet protection members 20 are placed without dividing the space in the radial direction. If the space is divided by the magnet protection members 20, the coolant flowing from the radially inward side toward the radially outward side will be obstructed. However, since the space is not divided, such coolant obstruction does not occur. In the embodiment, the spaces partitioned by the duct pieces 14 between adjacent rotor cores 5 in the axial direction correspond to spaces covered with rotor ducts 15.

In the embodiment, each of the magnet protection members 20 is shaped in a square-cornered C-shaped form to clamp each of the approximately rectangular solid shaped permanent magnets 3 from both sides of the permanent magnet 3 in the shaft direction. In other words, the magnet protection member 20 has a part to be located between the permanent magnet 3 and the rotor core 5 in the direction of the shaft 6 (the square-cornered C shape, a connection between the upper and lower sides), and parts bent from both ends of the above part along the outer shape of the permanent magnet 3 (the square-cornered C shape, the upper and lower sides). This causes an axial force to be applied to only the magnet protection member 20 when the magnet is inserted in the axial direction. The magnet protection member 20 has a function of further lessening the impact applied to the magnet permanent 3. The magnet protection members 20 are placed at both ends of each of the permanent magnets 3, the radially inward end and the radially outward end, to hold the permanent magnet 3 between them.

Figure 2:
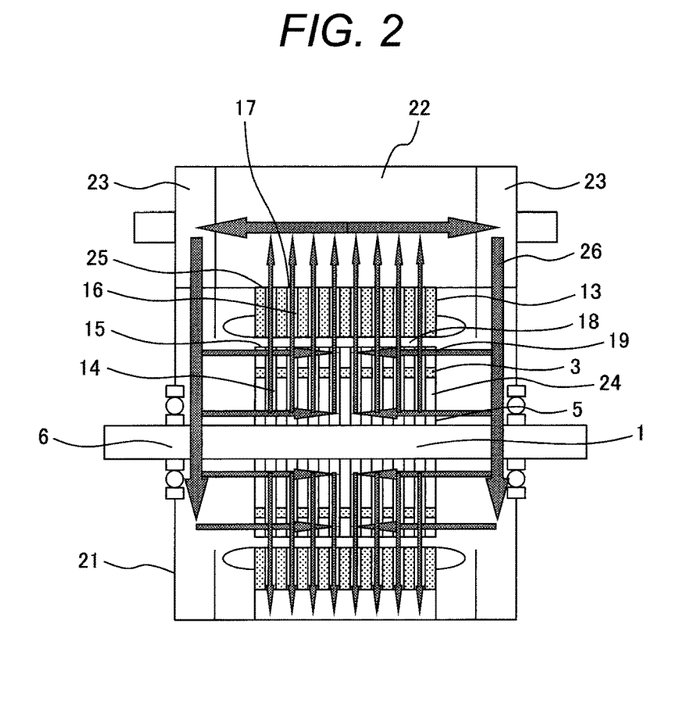
FIG. 2 is an axially sectional view of the permanent magnet electrical rotating machine according to the first embodiment of the present invention (Embodiment 1).

FIG. 2 shows an axially sectional view of the permanent magnet electrical rotating machine and ventilation paths according to the first embodiment. A current of air flows as shown by arrows 26. For ventilation, the rotor 2 is structured such that the rotor cores 5 made of silicon steel sheets with a thickness of 0.5 mm per piece or the like are laminated to a certain thickness to form a rotor packet 24, and then the duct pieces 14, made of, for example, metals such as aluminum, iron or the like, are placed between rotor packets 24, in order to form the rotor ducts 15 serving as the ventilation grooves. Likewise, the stator 1 is also structured such that the stator cores 13 made of silicon steel sheets with a thickness of 0.5 mm per piece or the like are laminated to a certain thickness to form a stator packet 25, and then the duct pieces 16, made of, for example, metals such as aluminum, iron or the like and serving as the spacers, are placed between stator packets 25 in order to form stator ducts 17.

In the embodiment, a cooler 22 is mounted to an upper portion of a frame 21 of the permanent magnet electrical rotating machine for thermal exchange with the outside of the permanent magnet electrical rotating machine. Fans 23 are mounted on both ends of the cooler 22. The embodiment employs the fans 23 of a type requiring external power, but a fan mounted to the shaft 6 may be utilized.

An air flow 26 produced by the fans 23 is caused to flow toward the axially inward area through any of an area between the spiders 7 (radially inward communication passage), the gap 18 and the between-pole ventilation grooves 19. The communication passage between the spiders 7 communicates with the rotor ducts 15, so that after passing through the area between the spiders 7, the air flow in the axial direction is induced to flow through the rotor ducts 15 toward the circumferential direction. After passing through the rotor ducts 15, the air flows through the gap 18 into the stator ducts 17, and then returns to the cooler 22. In the cooler 22, the thermal exchange with the outside of the electrical rotating machine is performed to cool the electrical rotating machine. The coolant used in the cooler 22 may be air, water or any other type of coolant without any problem as long as the electrical rotating machine can be prevented from losses. In this manner, an air flow is formed within the permanent magnet electrical rotating machine. In the rotor ducts 15, the heat generated by the permanent magnets 3 and/or the heat generated by the rotor cores 5 are removed. In the stator ducts 17, the heat generated by the stator cores 13 and/or the coil 10 is removed.

In the embodiment, the rotor ducts 15 and the stator ducts 17 are arranged to face each other at regular intervals in the axial direction(not required to be arranged at strictly regular intervals, and may be arranged at virtually regular intervals), and the axial end of the rotor is terminated at the rotor core. The structure is not intended to be exclusive, and the ducts may be misaligned. Further, the ducts may differ in width. The ducts may differ in number. The axial end of the rotor may be terminated at any point other than the rotor core. If the rotor ducts 15 and the stator ducts 17 face each other in positions at regular intervals in the axial direction, particularly, the flow loss in the radial direction can be reduced, further contributing to the enhancement in cooling ability.

Figure 3:
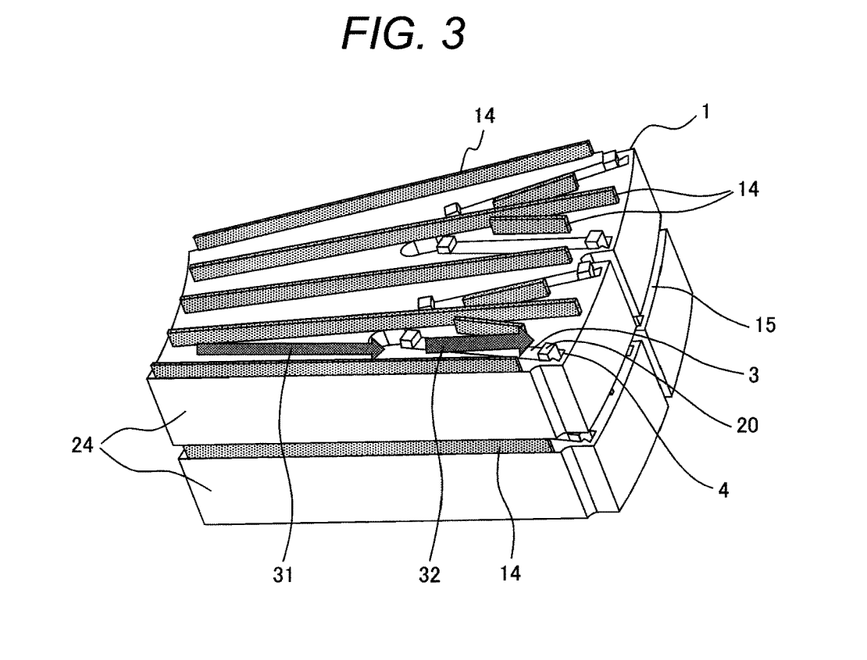
FIG. 3 is a bird's-eye view showing a rotor according to the first embodiment of the present invention (Embodiment 1).
Figure 4:
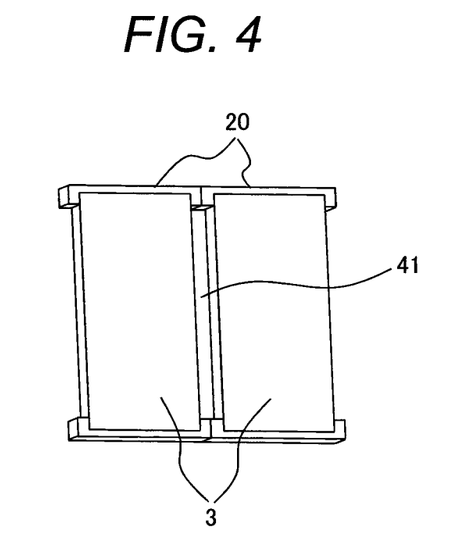
FIG. 4 is a diagram illustrating permanent magnets and magnet protection members according to the first embodiment of the present invention (Embodiment 1).

FIG. 3 shows a bird's-eye view of two rotor packets with two-pole rotor cores according to the first embodiment, to describe in more detail the rotor ducts 15 in FIG. 2. Also, FIG. 4 shows two sets of the permanent magnets 3 and the magnet protection members 20 according to the first embodiment. As shown in FIG. 3, as the rotor packets are laminated in the axial direction, the rotor ducts 15 is increasingly formed by the duct pieces 14. There is the axial center on left-hand side of FIG. 3, and the air flows from the axial center toward the outside-diameter peripheral direction as shown by arrow 31. Here, if the magnet protection member 20 is shaped to cover the entire surface of the permanent magnet, the rotor duct 15 will be blocked. This does not allow the air to flow as shown by arrow 32, which causes an increase in ventilation resistance, resulting in a reduction in ventilation rate. To avoid this, the magnet protection members 20 are formed on both end faces of the permanent magnet 3 such that a ventilation groove 41 is created as described in the embodiment illustrated in FIG. 4. Thereby, the air can flow as shown by arrow 32 in FIG. 3, ensuring the required ventilation rate. Specifically, in the embodiment, the magnet protection member 20 is designed to have a part to be located between the permanent magnet 3 and the rotor core 5 in the direction of the shaft 6, and parts bent from both ends of the above part to extend along the outer shape of the permanent magnet 3.

Figure 5:
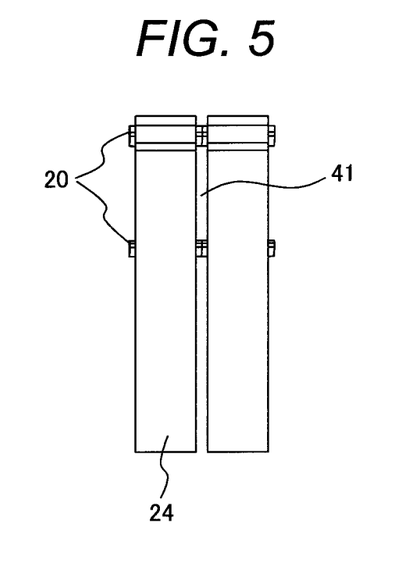
FIG. 5 is an axially sectional view showing the relationship between a rotor packet and the magnet protection member according to the first embodiment of the present invention (Embodiment 1).

FIG. 5 illustrates the relationship of the magnet protection member 20 with the rotor packet 24 and the ventilation groove 41 according to the first embodiment. It is seen that the permanent magnet 3 and the magnet protection members 20 are coupled in the axial direction as shown in FIG. 4, thereby creating the ventilation groove 41 between rotor packets 24.

Further, since the rotor cores 5 are structured by laminating thin plates such as of silicon steel sheets, the permanent magnet insertion hole 4 made in the rotor cores 5 has a slightly uneven surface in the axial direction. Because of this, when the permanent magnet 3 is inserted into the permanent magnet insertion hole 4 in the axis direction, the coating on the permanent magnet 3 may be damaged, such as be scratched off, by the slightly uneven surface, leading to a decrease in long term reliability. To avoid this, the existence of the magnet protection member 20 between the permanent magnet 3 and the rotor core 5 prevents direct contact between the permanent magnet insertion hole 4 and the permanent magnet 3, thus preventing the permanent magnet 3 from being damaged. In particular, if the magnet protection member 20 covers fully the permanent magnet 3 in the axial direction, preferably there is not any exposed portion having the risk of being damaged.

Further, the embodiment employs aluminum for the magnet protection member 20, but instead other metal, plastic or resin may be used. If a metal member is employed, using a non-magnetic material is preferable for avoidance of short-circuiting of magnetic flux of the permanent magnet 3.

Further, although not shown in the embodiment, even if a coating or any other protective material is used for the permanent magnet 3, any problem does not arise in the embodiment.

Further, the permanent magnet 3 and the magnet protection member 20 are desirably secured to each other with an adhesive or the like.

The magnet protection members 20 are placed to maintain radial continuity in, or to cause no radial division of, the space partitioned by the duct pieces 14 between rotor cores 5 adjacent to each other in the axial direction. This allows coolant to flow from the radially inward side toward the radially outward side, enabling the enhancement in cooling ability during operation. The enhancement in cooling ability may cause an increase in heat density of the permanent magnet electrical rotating machine, making it possible to reduce the size of the permanent magnet electrical rotating machine. Further, not only the cooling ability is enhanced, but also the permanent magnets can be prevented from being damaged in the assembling process because of the magnet protection member 20 placed between the permanent magnet 3 and the rotor core 5.

Embodiment 2

Figure 6:
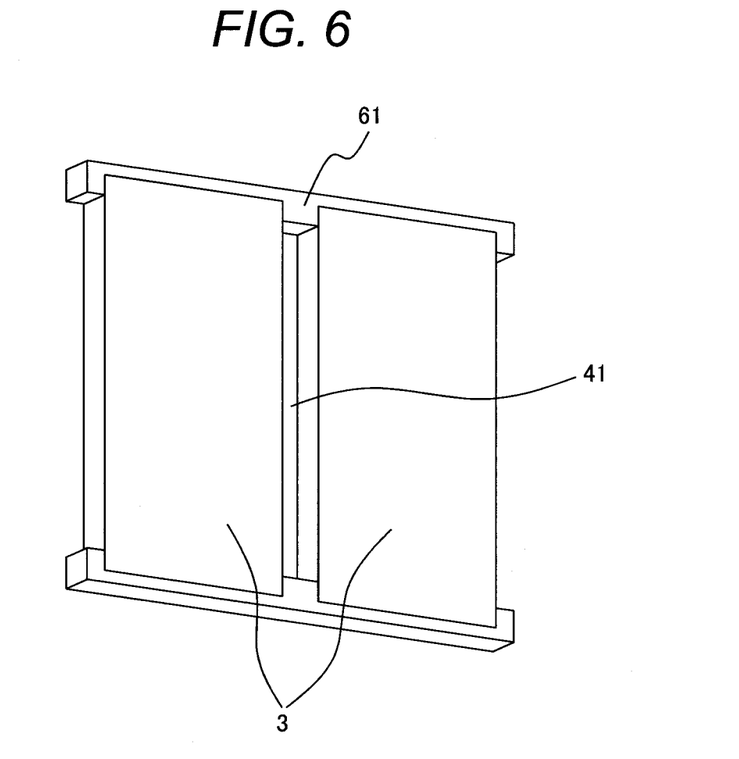
FIG. 6 is a diagram illustrating permanent magnets and magnet protection members according to a second embodiment of the present invention (Embodiment 2).

Referring to FIG. 6, the relationship between the permanent magnets and the magnet protection members according to a second embodiment is illustrated. In the embodiment, a single magnet protection member 61 extends in the rotating axis direction across between a plurality of adjacent permanent magnets 3 and the rotor cores 5 having the plurality of adjacent permanent magnets 3 mounted thereto. As shown in FIG. 6, the magnet protection member 61 is formed to couple the two magnets to each other in the axial direction, thereby reducing the number of insertions in the magnet inserting process. The example embodiment 2 is identical in other respects with example embodiment 1, and the repeated description is omitted here.

In each embodiment, the magnet protection members adjacent to each other in the rotating axis direction are placed in contact with each other. Because of this, the magnet protection members extending continuously in the rotating axis direction are capable of transferring a force in the axial direction. This especially contributes to the simplified insertion when the permanent magnets are inserted in the assembly process, and also the prevention of the inserted permanent magnets from moving in the axial direction.

It is should be noted that although each embodiment has described a concrete example of the magnet protection member 20 having a part placed between the permanent magnet 3 and the rotor core 5 in the direction of the shaft 6 and parts bent from both ends of the above part along the outer shape of the permanent magnet 3, for example, the magnet protection members may have parts differing in length in the rotating axis direction between the rotor cores. If the magnet protection members are designed to have parts differing in length in the rotating axis direction between rotor cores, a level difference is created in the rotating axis direction, enabling flowing of the air in the radial direction.

Further, if the magnet protection members have parts differing in length in the rotating axis direction between rotor cores, as a specific aspect, the magnet protection members may be at least partially broken between rotor cores. If the magnet protection members may be at least partially broken, the space created in the rotating axis direction is increased, further facilitating flowing of the air in the radial direction.

Further, the magnet protection member may be formed to have a shorter length in the rotating shaft direction between rotor cores than the duct piece serving as a spacer.

REFERENCE SIGNS LIST

1 . . . Stator,
2 . . . Rotor,
3 . . . Permanent magnet,
4 . . . Magnet insertion hole,
5 . . . Rotor core,
6 . . . Shaft,
7 . . . Spider,
8 . . . Upper coil,
9 . . . Lower coil,
10 . . . Coil,
11 . . . Stator teeth,
12 . . . Stator slot,
13 . . . Stator core,
14 . . . Duct piece,
15 . . . Rotor duct,
16 . . . Duct piece,
17 . . . Stator duct,
18 . . . gap,
19 . . . Between-pole ventilation-groove,
20 . . . Magnet protection member,
21 . . . Frame,
22 . . . Cooler,
23 . . . Fan,
24 . . . Rotor packet,
25 . . . Stator packet.
26 . . . Air flow,
31 . . . Air flow,
32 . . . Air flow,
41 . . . Ventilation groove,
61 . . . Magnet Protection member.

The invention claimed is:

1. A permanent magnet electrical rotating machine, comprising:
   permanent magnets;
   rotor cores that have the permanent magnets mounted to the rotor cores and that are laminated in a rotating axis direction;
   spacers that are placed between adjacent ones of the rotor cores; and
   permanent magnet protection members that are installed between the permanent magnets and the rotor cores and also placed to maintain radial continuity in space partitioned by the spacers between the rotor cores.

2. The permanent magnet electrical rotating machine according to claim 1, wherein the permanent magnet protection members have parts differing in length in the rotating axis direction between the rotor cores.

3. The permanent magnet electrical rotating machine according to claim 2, wherein the permanent magnet protection members are at least partially broken between the rotor cores.

4. The permanent magnet electrical rotating machine according to claim 3, wherein the permanent magnet protection members are placed to hold each of the permanent magnets between the permanent magnet protection members.

5. The permanent magnet electrical rotating machine according to claim 4, wherein the permanent magnet protection members each have a part provided between each of the permanent magnets and each of the rotor cores in the rotating axis direction, and parts respectively bent from both ends of the part in the rotating axis direction along an outer shape of the permanent magnet.

6. The permanent magnet electrical rotating machine according to claim 1, wherein the permanent magnet protection members each have a shorter length in the rotating axis direction between the rotor cores than that of the spacers.

7. The permanent magnet electrical rotating machine according to claim 1, wherein each of the permanent magnet protection members is placed to extend in the rotating axis direction across between a plurality of adjacent ones of the permanent magnets, and the rotor cores having the plurality of adjacent ones of the permanent magnets mounted to the rotor cores.

8. The permanent magnet electrical rotating machine according to claim 1, wherein
   the magnet protection members adjacent to each other in the rotating axis direction are placed in contact with each other.

9. The permanent magnet electrical rotating machine according to claim 1, further comprising a communication passage provided between adjacent magnetic poles and in outward ends of the rotor cores to create communication in the rotating axis direction.

10. The permanent magnet electrical rotating machine according to claim 1, wherein the permanent magnets and the permanent magnet protection members are bonded to each other with an adhesive.

11. The permanent magnet electrical rotating machine according to claim 1, further comprising a communication passage that is provided on the radial inward side of the permanent magnets for communication in the rotating axis direction, wherein the communication passage communicates with the space partitioned by the spacers between the rotor cores.

12. The permanent magnet electrical rotating machine according to claim 11, wherein the communication passage is formed by spiders that support the rotor cores on a rotating shaft and are adjacent to each other.

13. The permanent magnet electrical rotating machine according to claim 1, further comprising;
   stator cores that are placed to leave a gap from the rotor cores in the radial direction, and are laminated in the rotating axis direction; and
   stator spacers that are provided between adjacent ones of the stator cores.

14. The permanent magnet electrical rotating machine according to claim 13, wherein stator ducts formed between the stator cores by the spacers provided between the stator cores, and rotor ducts formed between the rotor cores by the spacers provided between the rotor cores are arranged opposite to each other and at regular intervals in the axial direction.

15. A permanent magnet electrical rotating machine, comprising:
   permanent magnets;
   rotor cores that have the permanent magnets mounted to the rotor cores and that are laminated in a rotating axis direction;
   spacers that are placed between adjacent ones of the rotor cores; and
   permanent magnet protection members that are installed between the permanent magnets and the rotor cores and also placed to causes no radial division of a space partitioned by the spacers between the rotor cores.

\* \* \* \* \*